US011873590B1

(12) United States Patent
Williams (10) Patent No.: US 11,873,590 B1
(45) Date of Patent: Jan. 16, 2024

(54) CARBON FIBER—CARBON NANOTUBE TOW HYBRID REINFORCEMENT WITH ENHANCED TOUGHNESS

(71) Applicant: United States of America as represented by the Administrator of NASA, Washington, DC (US)

(72) Inventor: Tiffany Williams, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 274 days.

(21) Appl. No.: 16/999,683

(22) Filed: Aug. 21, 2020

Related U.S. Application Data

(60) Provisional application No. 62/889,855, filed on Aug. 21, 2019.

(51) Int. Cl.
*D04C 1/12* (2006.01)
*D06M 15/55* (2006.01)

(52) U.S. Cl.
CPC ............... *D04C 1/12* (2013.01); *D06M 15/55* (2013.01); *D10B 2101/122* (2013.01); *D10B 2505/02* (2013.01)

(58) Field of Classification Search
CPC .. D04C 1/06; D04C 1/12; D04C 3/48; D06M 15/55
See application file for complete search history.

(56) References Cited

U.S. PATENT DOCUMENTS

| 4,847,063 A * | 7/1989 | Smith ................. C04B 35/83 87/9 |
| 6,250,193 B1 * | 6/2001 | Head ....................... D04C 3/48 87/8 |
| 8,561,514 B2 | 10/2013 | Head, III et al. |
| 2009/0282802 A1 | 11/2009 | Copper et al. |
| 2012/0144984 A1 * | 6/2012 | Head, III ............... D04C 3/18 87/8 |
| 2014/0356613 A1 * | 12/2014 | Weisenberger .......... C09K 5/14 252/75 |
| 2015/0260328 A1 * | 9/2015 | Colcombet ............. B32B 27/12 28/169 |

(Continued)

OTHER PUBLICATIONS

Bogdanovich, A E; Bradford, P. D., Carbon Nanotube Yarn and 3D Braid Composites: Tensile Testing and Mechanical Properties Analysis. Compos. Part A Appl. Sci. Manuf. 2010, vol. 41, Issue 2, pp. 230-237.

(Continued)

*Primary Examiner* — Shaun R Hurley
(74) *Attorney, Agent, or Firm* — Robert H. Earp, III; Mark Wolfgang; Trenton J. Roche (57) ABSTRACT

A triaxially hybrid braid reinforcement material for polymer matrix composites. The braid includes hybrid tows, which include at least one carbon fiber tow commingled with carbon nanotube yarns to introduce toughness to the hybrid tows. The hybrid tows may be arranged in any and all of the braiding directions. The braid may also include carbon fiber tows, which can be arranged in the axial direction or other braiding directions not occupied by the hybrid tows. The braid is infiltrated with resin, which is impregnated into the braid and cured, to form the toughened polymer matrix composite.

17 Claims, 5 Drawing Sheets

(56) References Cited

U.S. PATENT DOCUMENTS

| | | | | |
|---|---|---|---|---|
| 2015/0275408 | A1* | 10/2015 | Tahara | D04C 3/28 |
| | | | | 87/9 |
| 2016/0055936 | A1* | 2/2016 | Head | D04C 1/12 |
| | | | | 87/8 |
| 2016/0200460 | A1* | 7/2016 | Aston | B32B 5/028 |
| | | | | 428/688 |
| 2017/0370039 | A1* | 12/2017 | Kladitis | C01B 32/168 |
| 2018/0029313 | A1* | 2/2018 | Laberge Lebel | B29C 70/541 |
| 2020/0061934 | A1* | 2/2020 | Rudolph | B29C 70/382 |
| 2020/0139644 | A1* | 5/2020 | Ogale | B29C 53/005 |
| 2020/0139645 | A1* | 5/2020 | Ogale | B29C 53/60 |
| 2020/0188117 | A1* | 6/2020 | Tan | D03D 1/00 |
| 2020/0306891 | A1* | 10/2020 | Rufin | D04C 3/14 |

OTHER PUBLICATIONS

Bradford, P D; Bogdanovich, A E., Fabrication and Properties of Multifunctional, Carbon Nanotube Yarn Reinforced 3-D Textile Composites; 16th International Conference on Composite Materials (ICCM) 2017, Kyoto, Japan.

Singh, B P; Choudhary, V; Singh, V N; Mathur, R B., Growth of carbon nanotube filaments on carbon fiber cloth by catalytic chemical vapor deposition. Appl. Nanosci. 2014, 4, pp. 997-1003.

\* cited by examiner

CARBON FIBER—CARBON NANOTUBE TOW HYBRID REINFORCEMENT WITH ENHANCED TOUGHNESS

CROSS REFERENCE TO RELATED APPLICATION

This application claims priority to U.S. Provisional Patent Application Ser. no. 62/889,855 filed Aug. 21, 2019, which is expressly incorporated herein by reference.

ORIGIN OF THE INVENTION

The invention described herein was made by an employee of the United States Government and may be manufactured and used by or for the Government for Government purposes without the payment of any royalties thereon or therefor.

BACKGROUND

Polymer matrix composites (PMCs) are usually limited in providing adequate toughness required for aerospace structures. Carbon fiber-reinforced PMCs are desired for use in aerospace structures because of their high stiffness-to-weight ratio. Carbon fiber is well-known to display remarkable strength and stiffness, and triaxially braided carbon fibers are often used in aerospace structures, such as composite fan casings and rotors. However, carbon fibers are brittle, and sometimes pose challenges for load bearing applications or for parts requiring complex geometries. In addition, the high stiffness of carbon fiber reinforced composites makes it difficult to withstand applications involving long periods of vibrations and certain impact events. To introduce toughness, as with other PMCs in general, a rubber-toughened filler, thermoplastics, or nanoparticle additives are often introduced to the polymer matrix to enhance the toughness of the PMCs. However, these additives can make the resin more viscous and expensive. In addition, if the composite has to be used in an environment where it is exposed to cryogenic environments, then the presence of additives to the matrix may make the composite even more brittle. Increasing composite toughness by growing nanoparticles from the surface of carbon fiber fabrics is another technique employed to enhance composite toughness, but it often involves synthesis methods that are difficult to control and sometimes yields minimal improvements in toughness. Moreover, ply stitching can damage fibers, and in some cases, the mechanical properties deteriorate.

Many toughened resins are sold as products already impregnated into the fiber as "prepreg." This is because the additives often produce a significant increase in resin viscosity, which makes processing more difficult. Including the resin in the prepreg minimizes processing challenges associated with handling high viscosity resins. However, the toughening additives in the resin also make the prepreg, like the resin, more expensive.

Triaxially braided carbon fibers are used in aerospace composites to enhance damage tolerance. Additionally, some commercially available hybrid triaxial braids are made from a combination of two or more types of fibers, such as glass fiber and carbon fiber, or Kevlar fiber and carbon fiber. Kevlar and carbon fiber hybrid triaxial braids tend to be used for a toughened reinforcement; however, Kevlar has low UV stability so its properties tend to degrade over time if used in exterior applications, which makes Kevlar not ideal for use in some aerospace structures. Therefore, there currently exists a need to enhance the toughness of aerospace-grade composites without sacrificing mechanical strength or incurring a mass penalty.

SUMMARY

A triaxial hybrid braid includes hybrid tows. The hybrid tows include carbon nanotube yarns commingled with a carbon fiber tow. The hybrid tows are included in a + bias direction of the braid, a − bias direction of the braid, an axial direction of the braid, or combinations thereof. The braid may further include carbon fiber tows arranged in braiding directions not occupied by the hybrid tows.

A composite including a triaxial hybrid braid and a cured resin. The braid includes hybrid tows. The hybrid tows include carbon nanotube yarns commingled with a carbon fiber tow. The hybrid tows are included in a + bias direction of the braid, a − bias direction of the braid, an axial direction of the braid, or combinations thereof. The braid may further include carbon fiber tows arranged in braiding directions not occupied by the hybrid tows.

A method of making a composite material includes commingling carbon nanotube yarns with a carbon fiber tow to produce hybrid tows, and triaxially braiding the hybrid tows to form a braid. The hybrid tows are arranged in a + bias direction of the braid, a − bias direction of the braid, an axial direction of the braid, or combinations thereof. The hybrid tows are optionally triaxially braided with carbon fibers tows. The braid is optionally impregnated with resin, which is cured.

DETAILED DESCRIPTION

This invention relates to a controlled approach to increase toughness of composite materials (e.g. PMCs) through the use of a new hybrid reinforcement material without decreasing the mechanical properties of the reinforcing material or reduce PMC stiffness, and with using little to no toughening agents to modify the resin matrix.

The present invention uses continuous carbon nanotube (CNT) yarns in a hybrid reinforcement material for composite applications. CNT yarns have characteristics, which may include having a lower density and being more ductile than carbon fiber while still being quite strong, which make them suitable for use in the hybrid reinforcement material. Because of their high ductility, some grades of CNT yarns are more robust than carbon fiber and do not fray or shed during handling. CNT yarns are also UV stable and do not absorb moisture, so their properties may not degrade in the manner that aramid fibers deteriorate. However, the mechanical properties of many bulk CNT formats, including yarns, are inferior to aerospace-grade carbon fiber and large quantities of high quality CNTs have been difficult to process, and thus have not completely replaced the use of carbon fibers in PMC structural applications.

With this in mind, the present subject matter provides a high strength hybrid reinforcement material having enhanced toughness over traditional carbon-fiber-only reinforcement material, and it could therefore be suitable for use in composite structures.

Figure 8:
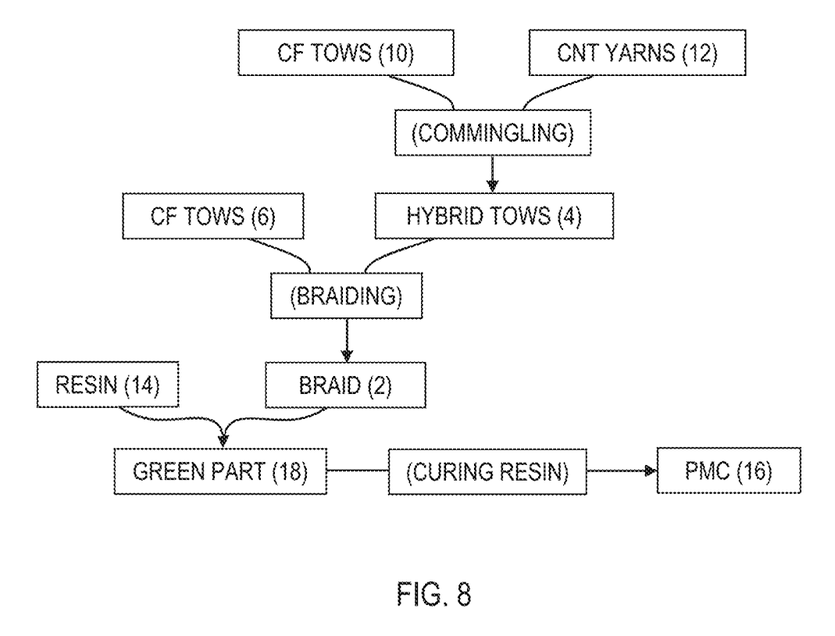
FIG. 8 is a flow chart of a method in accordance with the present subject matter.

More particularly and with reference to the figures, and especially FIG. 8, the present subject matter relates to hybrid braided material 2, also referred to herein as a "hybrid braid" or "braid." The hybrid braid 2, which itself is a composite material, includes hybrid tows 4 braided with carbon fiber (CF) tows 6. The hybrid tow 4 include bundles of continuous CNT yarns 12 commingled with one or more carbon fiber (CF) tows 10. As used herein, "carbon fiber tows 6" and "carbon fiber tows 10" are so numbered in order to differentiate between the two components of the hybrid braids 2, but otherwise may be the same type or a different type of carbon fiber material. That is, the CF tows 6 are carbon fibers that are triaxially braided with the hybrid tows 4 to make the braid 2, while the CF tow 10 are carbon fibers that are commingled with continuous CNT yarns 12 to make the hybrid tows 4.

The present subject matter also relates to composite materials, such as PMCs 16. The composite material, e.g. PMCs 16, include the braid 2 and a resin 14 infiltrated into the braid 2 and then cured or formed through molding. The present subject matter also relates to a method of making the braid 2, and a method of making the hybrid composite materials, e.g. PMCs 16. For PMC applications requiring high damping, the role of the carbon fiber tow(s) 10 in the hybrid tows 4 may be to retain mechanical strength, while the role of the CNT yarns 12 may be to introduce minor slippage at the CNT/resin interface in the hybrid tows 4.

The triaxial hybrid braid 2, used as reinforcement material for PMCs 16, demonstrates superior toughness over traditional carbon fiber reinforcement material by incorporating ductile CNT yarns 12 in the braid 2, and does not demonstrate a significant knockdown in mechanical strength.

As used herein, a "fiber" is an individual piece of elongated material that has a length significantly longer than its width; a "staple fiber" is a fiber of short length; a "filament" or "filament fiber" is a fiber of continuous or near continuous lengths; a "tow" is a bundle of loosely joined fibers or filaments that are not twisted; and a "yarn" is a twisted bundle of fibers, i.e. a twisted tow. It should be noted that it is also common in the art to use the term "yarn" in braiding to describe or identify the fiber in a braided material or textile, e.g. "braiding yarn," "axial yarn," or "bias yarns."

1. Braid

The braid 2 includes hybrid tows 4 optionally braided with CF tows 6. The braid 2 may be a biaxial braid, a triaxial braid, a quadraxial braid, or others. The braid 2 may be a two-dimensional (2D) braid or a three-dimensional (3D) braid or preform. The braid 2 may be in the form of a sheet, a tube, or in another form.

When the braid 2 is a 2D triaxial braid, it has braiding strands or yarns in the various braiding directions with respect to the direction of braiding, the braiding direction being the axial direction D of the braid 2, and the other braiding directions being the positive/plus bias direction (+θ) and the negative/minus bias direction (−θ). The hybrid tows 4 may be arranged in any or all of the braiding directions, with any remaining braiding direction(s) being occupied by the CF tows 6. In a non-limiting embodiment (FIG. 9), the braiding strands in the ± bias directions include the hybrid tows 4, and the braiding strands in the axial direction include the CF tows 6. The hybrid tows 4 may be in one or both of the ± bias directions of the braid 2, and the carbon fiber tows 6 may be in the axial direction D. The hybrid tows 4 may also be in all of the ± bias and axial directions. In an embodiment, the hybrid tows 4 are in both the ± bias directions of the braid 2, and the carbon fiber tows 6 are in only the axial direction of the braid 2. In another embodiment, the hybrid tows 4 are in only one of the bias directions of the braid 2, and the carbon fibers 6 are in the axial direction of the braid 2 and in the other bias direction of the braid 2 if the application would call for such an arrangement. The braiding strands in the ± bias directions of the braid 2 may be arranged in a diamond pattern, a regular pattern, a hercules pattern, or other patterns.

The toughness of the hybrid tows 4 is greater than that of a comparable carbon fiber tow. In addition, the failure load of the dry hybrid tows 4 is higher than the comparable carbon fiber reinforcement material when the mass of the constituents are taken into consideration. Both components of the hybrid tows 4 include a graphitic chemical structure, and therefore the toughened hybrid braid 2 made with the hybrid tows 4 should not be sensitive to UV exposure. Because the fibers in the hybrid tows 4 display better toughness than comparable carbon fiber tows 6, the hybrid braid 2 made with hybrid tows 4 may be infiltrated using less viscous and less inexpensive polymer resins to form PMCs 16.

The braid 2 may have any number of braiding strands. In a non-limiting embodiment, the braid 2 includes 72 total braiding strands that are triaxially braided, optionally using a 2D circular braider. Of these 72 braiding strands, 48 braiding strands may be in the ± bias directions, all or some of which may be the hybrid tows 4; and 24 braiding strands may be in the axial direction, all or some of which may be the CF tows 6 or hybrid tows 4. Of the 48 braiding strands in the ± bias directions, 24 are in the + bias direction and the remaining 24 are in the − bias direction. Other numbers of braiding strands can be used to form the braid 2, including for example 36 or 144.

The braid 2 may have various coverage rates, including a coverage rate of 80-99.9%, 90-99.5%, 95-99%, or other coverage rates. The coverage rate of the braid 2 depends on a number of factors including operation parameters of a braiding machine, such as mandrel traverse rate, turn rate of the carriers around the mandrel, the number and size of the braiding strands being used, etc., and is basically a function of the area of the mandrel covered by the braid 2 versus area of the mandrel not covered by the braid 2, i.e. openings 8 between the braiding strands 4, 6.

Figure 2:
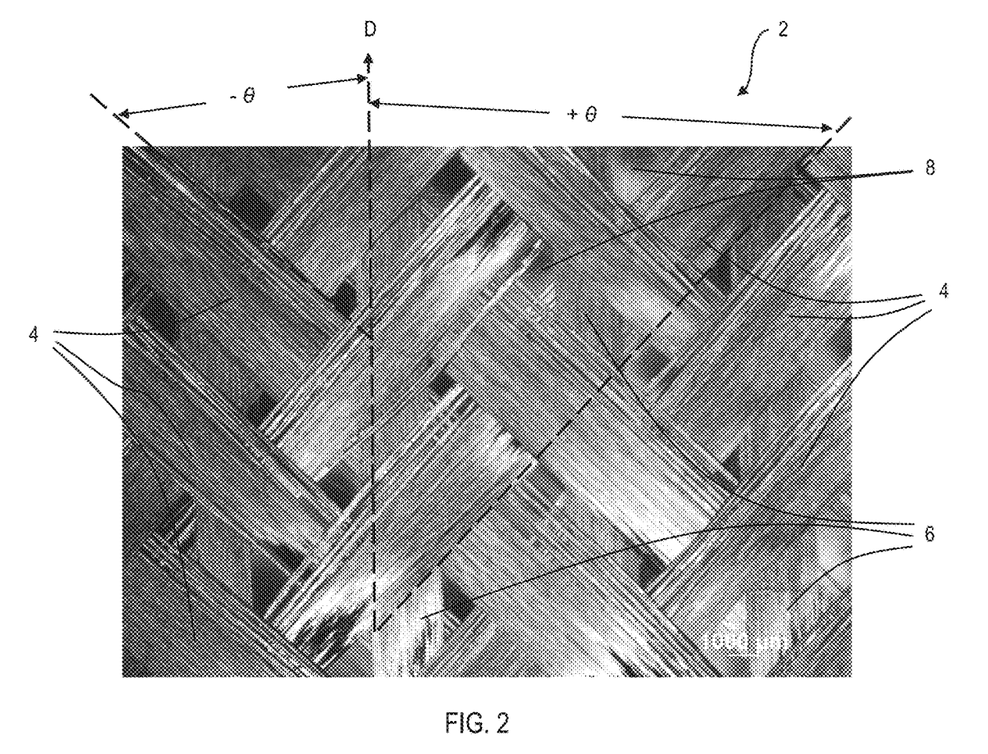
FIG. 2 is a drawing showing a detailed portion of a triaxial braid in accordance with the present subject matter.
Figure 9:
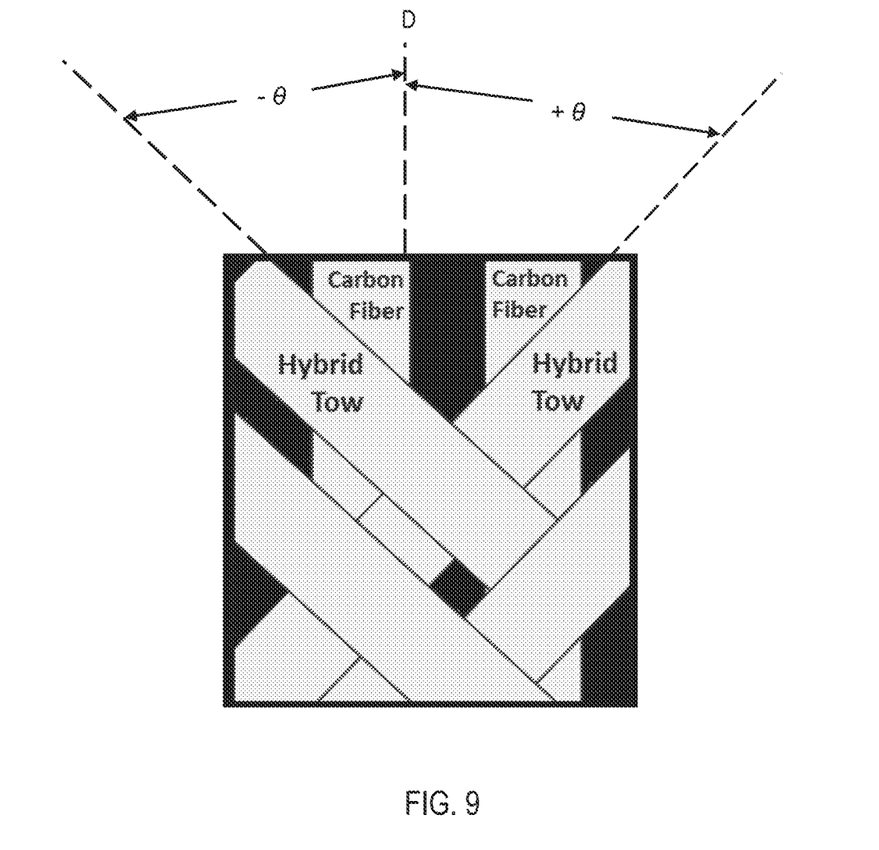
FIG. 9 is a schematic top view of a hybrid reinforcement material in accordance with the present subject matter.

The braid 2 may have a braid angle of 40-80 degrees, 50-70 degrees, or 55-65 degrees, or other braid angles. The braid angle is the angle (either +θ or −θ) between the braiding strands in the ± bias directions (e.g. hybrid tows 4) and the braiding strands in the axial direction (e.g. CF tows 6) as depicted in FIGS. 2 and 9.

2. Carbon Fibers

The CF tows 6, 10 include bundles of carbon fibers. The CF tows 6 are triaxially braided with the hybrid tows 4 to make the braid 2, while the CF tow(s) 10 is commingled with CNT yarns 12 to make the hybrid tows 4. The CF tows 6, 10 are not particularly limited, and the material of each may be selected independent from the other. Each may include a variety of types of carbon fibers so as to produce a desired property in the hybrid tows 4, in the braid 2, or in the PMCs 16.

The CF tows 6, 10 may each be 5-10 μm in diameter, and have 1000-15000 (i.e. 1K to 15K), or 3000-12000 (i.e. 3K to 12K), 5000-7000 (i.e. 5K to 7K), 5500-6500 (i.e. 5.5K to 6.5K), or 6000 (i.e. 6K) carbon filaments in each tow of carbon fibers. The CF tows 6, 10 may include sizing agents, which facilitate easier handling and may promote better bonding between the fiber and resin 14 of the PMCs 16.

The CF tows 6, 10 may be Ultra-high-modulus, type UHM (modulus >450 Gpa); High-modulus, type HM (modulus between 350-450 Gpa); Intermediate-modulus, type IM (modulus between 200-350 Gpa); Low modulus and high-tensile, type HT (modulus<100 Gpa, tensile strength>3.0 Gpa); or Super high-tensile, type SHT (tensile strength>4.5 Gpa). The CF tows 6, 10 may be PAN-based carbon fibers, pitch-based carbon fibers, mesophase pitch-based carbon fibers, isotropic pitch-based carbon fibers, rayon-based carbon fibers, or gas-phase-grown carbon fibers.

The CF tows 6, 10 may be Type-I, high-heat-treatment carbon fibers (HTT), where final heat treatment temperature should be above 2000° C. and can be associated with high-modulus type fiber; Type-II, intermediate-heat-treatment carbon fibers (IHT), where final heat treatment temperature should be around or above 1500° C. and can be associated with high-strength type fiber; or Type-III, low-heat-treatment carbon fibers, where final heat treatment temperatures not greater than 1000° C. These are low modulus and low strength carbon fiber grades.

Various commercially available CF tows 6, 10 could be used, including various types of HexTow® carbon fibers, such as IM7 and AS4, which are available from Hexcel Corporation of Stamford, Connecticut, USA.

3. Hybrid Tows

The hybrid tows 4 include continuous carbon nanotube yarns 12 commingled with one or more CF tows 10. Commingling may be accomplished by aligning and combining together the CF tow(s) 10 with the CNT yarns, e.g. on a filament winder. As such, the CNT yarns 12 and CF tow(s) 10 are not merely contacting each other, but are commingled in such a way as they are joined to form a single bundle that is the hybrid tow 4. Other methods of commingling may be used to form the hybrid tows 4.

The hybrid tows 4 may have a weight ratio of the CF tow(s) 10 to the CNT yarns 12 of 10:90 to 90:10, 20:80 to 80:20, 30:70 to 70:30, 40:60 to 60:40, 45:55 to 55:45, 50:50, or 60:40 to 70:30. If the weight ratio is 60:40 to 70:30, then this means that 30-40 wt % of the hybrid tows 4 comes from the CNT yarns 12. The hybrid tows 4 may have any total number of CF tow(s) 10 and CNT yarns 12 commingled together, and this total number may depend on the number of carbon filaments in the CF tow(s) 10, and the desired weight ratio of CF tow(s) 10 to CNT yarns 12. In a non-limiting embodiment, the hybrid tows 4 have 4-7 strands of the continuous CNT yarns 12 and one CF tow 10. However, more or less CNT yarns 12 can be included in the hybrid tows 4, and more than one CF tow 10 can be included in the hybrid tows 4.

The CF tow(s) 10 used in the hybrid tows 4 may be the same or different type of material than the CF tows 6 that are triaxially braided with the hybrid tows 4 to form the braid 2.

The CNT yarns 12 may be a twisted bundle of CNTs and may have a diameter of 275-320 μm. A suitable CNT yarn is Miralon® Yarn available from Huntsman Corporation, d.b.a., Nanocomp Technologies Inc. of Merrimack, NH, USA.

4. PMCs

The PMCs 16 may include one or more of the hybrid braids 2, and these may be arranged within the PMCs 16 in any desired configuration, including for example, in a stack of plies/layers to achieve a certain laminate thickness, as a single ply/layer, or as a multi-layered structure or preform. The resin 14 used to form the PMCs 16 is not particularly limited, and may include various thermoset or thermoplastic resins, which may be impregnated into the braid 2 and cured. Impregnation of the braid 2 by the resin 14 may be accomplished using various methods including vacuum impregnation, immersion of the braid 2 in the resin 14, brushing, pouring, or braiding pultrusion, other impregnation methods. Once the resin 14 is impregnated into the braid 2 to form a green part 18, the resin 14 is cured to form the PMC.

The resin 14 used to form the PMCs 16 may include epoxies, phenolics, polyurethanes, polyimides, polyester, vinyl ester, polyamides, polypropylene, polyether ether ketone, or combinations thereof. Various curing agents may also be included to cure the resin 14, and other additives may be added to adjust the properties of the resin 14, the green part 18, or the PMCs 16.

5. Methods

Figure 3:
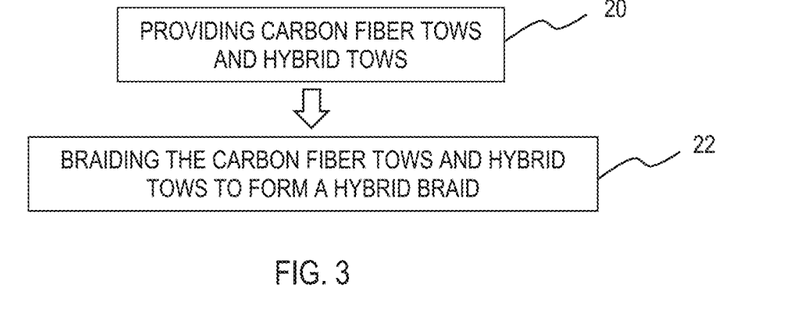
FIG. 3 is a method in accordance with the present subject matter.

The present subject matter includes a method (FIG. 3) of making the hybrid braid 2. With reference to FIG. 3, the method includes at 20, providing CF tows 6 and hybrid tows 4 including continuous CNT yarns 12 commingled with CF tow(s) 10. The method may include commingling the CNT yarns 12 with the CF tow(s) 10 to produce the hybrid tows 4 as depicted in FIG. 8. The commingling may be accomplished by hand, but controlled commingling under constant tension may be accomplished by a machine such as a filament winder.

The method includes at 22, braiding the CF tows 6 with the hybrid tows 4. This braiding may be accomplished using a braiding machine. The method may include impregnating the hybrid tows 4 with resin 14 before they are braided with the CF tows 6. The braiding may be triaxially braiding the CF tows 6 with the hybrid tows 4 to form a triaxial hybrid braid 2. The triaxially braiding may include arranging the hybrid tows 4 in bias directions, and arranging the CF tows 6 in the axial direction as depicted in FIG. 2. However, the method may include arranging the hybrid tows in the + bias direction of the braid, the − bias direction of the braid, the axial direction of the braid, or combinations thereof, while the CF tows 6 are arranged in any remaining braiding directions not occupied by the hybrid tows 4. In this way, it is possible that the braid 2 may include no CF tows 6. Depending on the mandrel, triaxial braiding may be performed on a circular braider at a braid speed of 3-9 rotations of the carriers per minute, and a mandrel speed of 10-30 inches per minute.

Figure 4:
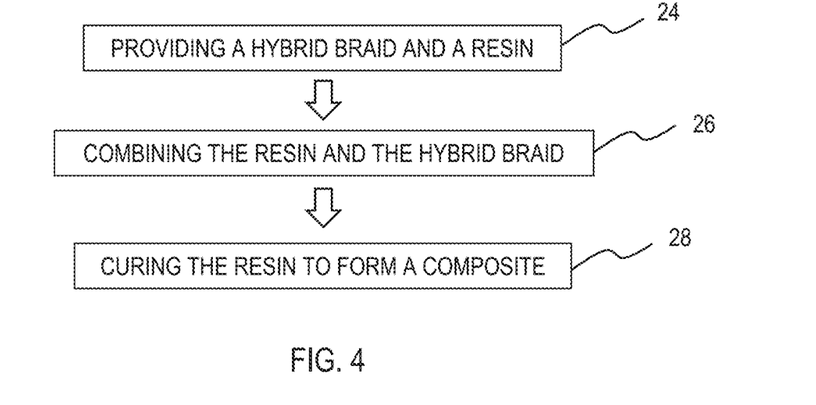
FIG. 4 is a method in accordance with the present subject matter.

The present subject matter includes a method (FIG. 4) of making a composite, e.g. a PMC. The method of making the composite includes at step 24, providing the hybrid braid 2 and a resin 14. The hybrid braid 2 may be provided by practicing the method of making the hybrid braid 2 depicted in FIG. 3. At step 26, the resin 14 is combined with the braid 2 to form a green part 18. The resin 14 may be combined with the braid 2 by impregnating the braid 2 with the resin 14, e.g. vacuum impregnating the braid 2 with the resin 14, immersion of the braid 2 in the resin 14, coating the braid 2 with resin 14, resin transfer molding, or other techniques. The green part 18 may have various shapes and configurations, and may include one or more hybrid braids 2. The hybrid braids 2 may be arranged or laid up in one or more plies/layers, which may overlap each other or not. The method may include stacking other layers of material with the layer(s) of hybrid braid 2. The other layers may include one or more layers of carbon fiber triaxial braid. The method includes at step 28, curing the resin 14 in the green part 18 to form a composite including the cured resin 14 and the hybrid braid 2. Curing may be accomplished by crosslinking in the case of a thermoset resin, or by melting and forming in the case of a thermoplastic resin. It should be appreciated that the specific steps in FIG. 4 provide a particular method of making a composite according to an embodiment of the present invention. Other sequences of steps may also be performed. Moreover, the individual steps may include multiple sub-steps that may be performed in various sequences as appropriate to the individual step. Furthermore, additional steps may be added depending on the particular applications.

6. Examples

The following examples were prepared, and these illustrate, but do not limit, the invention. The tensile strength of the carbon fiber-CNT hybrid tows were measured first, and these measurements were used to vary the CNT yarn content in the hybrid tows in the various examples.

To carry out the tensile tests, the density, both dry and impregnated with resin, were calculated. The mass and length of each example was recorded. The density of each example was recorded in units of tex, (g/km). Tensile tests on the carbon-fiber-only control strands and on the hybrid tows were done according to ASTM D4018-11. To prepare the dry control strands and hybrid tows for tensile testing, five to ten samples of each at 20 cm length were provided.

Table 1 below shows a list of all examples that were tensile tested. Five examples of each type were tensile tested. The comparative carbon-fiber-only control tow was a single tow of 6K carbon fiber material available from Hexcel. For the hybrid tows, each example included a single tow of 6K carbon fiber material and additionally contained either four, five, six, or seven continuous CNT yarns, which were CSY CNT yarns purchased from Nanocomp. For the tow mechanical testing, the CNT yarns were commingled by hand with IM7 carbon fiber. The tensile properties were measured on both dry and resin impregnated tows. Five specimens in each sample group were impregnated with the Epon 862 epoxy resin and Epikure W curing agent.

The hybrid tows were prepared by commingling CF tows with CNT yarns. In some cases, the combined number of spools of carbon fiber tow(s) and CNT yarns that were commingled together to produce the hybrid tows was 5-8. The combined number of spools of carbon fiber tow(s) and CNT yarns used to make the hybrid tows could be more or less than 5-8, and can be for example, 2-100. The number of strands of CNT yarns included in the hybrid tow were varied so as to vary the mass content of CNT yarns in the hybrid tow. This was done to determine the effect of CNT content on the tensile strength of the hybrid tows.

The identification "CF" in Table 1 represents a carbon-fiber-only control strands, which was not commingled with CNT yarns. The inventive example identified as "H4_1" includes the "H" to indicate "hybrid, "4" to indicate that four CNT yarns were used in the hybrid tow, and "1" to indicate that it was the first specimen of this material. As such, "H4_1" represents specimen one of the hybrid tows, which includes four CNT yarns commingled with one CF tow, which produced a hybrid tow with 32.4 wt % of CNT yarns. Examples H4_2 through H4_5 were produced in the same way. The resin impregnated specimens H4_6 through H4_10 were identical, respectively, to the H4_1 through H4_5 specimens, but further included resin impregnated therein. The H5 through H7 series specimens were produced in the same way as the H4 series specimens.

TABLE 1

| Weight % CNT in Example | 0 wt % | 32.4 wt % | 36.7 wt % | 41.4 wt % | 46.6 wt % |
|---|---|---|---|---|---|
| Dry Examples | CF_1 | H4_1 | H5_1 | H6_1 | H7_1 |
|  | CF_2 | H4_2 | H5_2 | H6_2 | H7_2 |
|  | CF_3 | H4_3 | H5_3 | H6_3 | H7_3 |
|  | CF_4 | H4_4 | H5_4 | H6_4 | H7_4 |
|  | CF_5 | H4_5 | H5_5 | H6_5 | H7_5 |
| Resin Impregnated Examples | CF_6 | H4_6 | H5_6 | H6_6 | H7_6 |
|  | CF_7 | H4_7 | H5_7 | H6_7 | H7_7 |
|  | CF_8 | H4_8 | H5_8 | H6_8 | H7_8 |
|  | CF_9 | H4_9 | H5_9 | H6_9 | H7_9 |
|  | CF_10 | H4_10 | H5_10 | H6_10 | H7_10 |

The hybrid tows included one strand of IM7 6K carbon fiber available from Hexcel, commingled with 4-7 strands of CSY CNT yarn purchased from Nanocomp. The carbon fiber control and hybrid tows were impregnated with a resin, as specified in ASTM D4018-11, which was a 100:26.4 ratio of Epon 862 and Epikure W mixed by hand, followed by mixing with a magnetic stirrer until the solution was homogenous. The epoxy resin mixture was then transferred to a vacuum oven and degassed by heating to 70-80° C. for 45-60 minutes, or until bubbling subsided.

A 50/50 resin-to-fiber ratio was targeted for impregnating the specimens. Epoxy resin was pre-weighed each time prior to application to each tow, in order to maintain consistency in resin mass uptake in all examples. The resin was applied to each tow by brushing or pouring. The impregnated examples were then cured on a hot press at 177° C. at 110 psi for 2 hours. After curing on the hot press, the specimens were re-weighed and an average resin content of 37% was determined for most of the examples.

All tow tensile tests were performed according to ASTM Standard D4018-11. The specific tensile strengths of the fiber tows were calculated with respect to the tex value of each specimen. A standard length of 200 mm was used when calculating the tex of all samples.

The specimens were tested using an MTS equipped with a 200 lb load cell. The test speed was 10 mm/min. An effective gauge length of 15 cm was used. All examples were originally tabbed with 1"×1" paper, with an effective gauge length between the tabs of 15 cm according to ASTM Standard D4018-11. However, complications during testing resulted in changing the tabs to a harder, thicker plastic material. Using thicker tabs helped prevent fiber damage caused by serrated grip faces that were used during tensile testing. A shear press was used to stamp out the tabs in dimensions of 1"×¾". All plastic tabs were sandblasted on one side to enhance bonding with the epoxy bonding agent when adhering the fibers to the tabs. Five-minute epoxy was used to adhere the fibers to the plastic tabs. The samples were allowed to dry overnight prior to mechanical testing.

Figure 5:
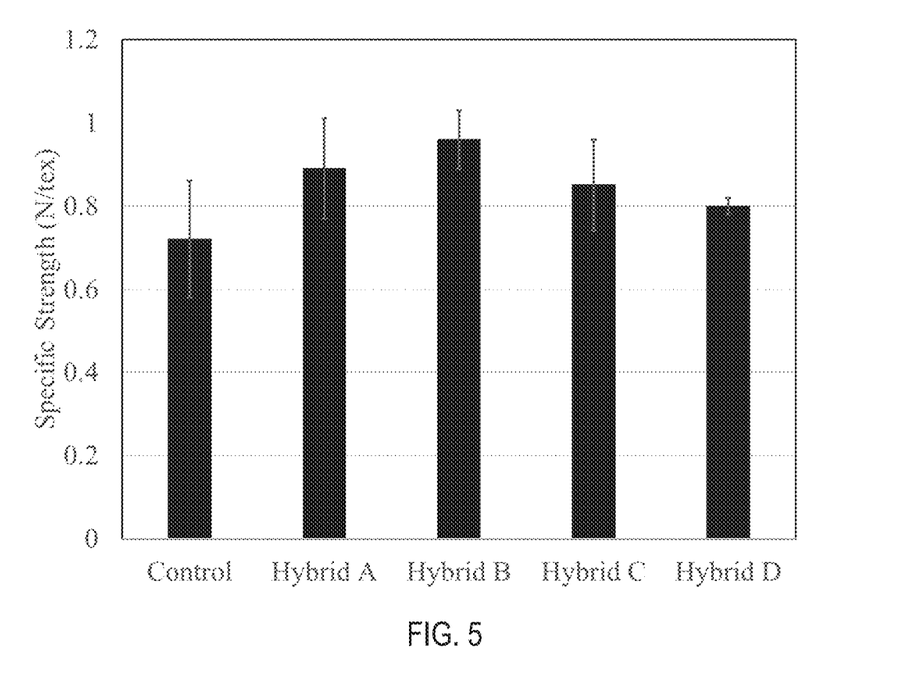
FIG. 5 is a graph showing performance characteristics of example hybrid tow and a control in accordance with the present subject matter.

Table 2 shows how the tensile load of the dry examples was affected by CNT yarn addition to the CF tow. Table 3 shows how the tensile load of resin impregnated examples were affected by CNT yarn addition. FIG. 5 illustrates the effect of CNT yarn on the normalized tensile strength for the dry examples. In each of Table 2, Table 3, and FIG. 5, the carbon-fiber-only control strands are labeled "Control", the hybrid tows with four CNT yarns are labeled "Hybrid A", the hybrid tows with five CNT yarns are labeled "Hybrid B", the hybrid tows with six CNT yarns are labeled "Hybrid C", and the hybrid tows with seven CNT yarns are labeled "Hybrid D".

TABLE 2

| Dry Examples | Max Load (N) | Tex Value/(g/km) |
| --- | --- | --- |
| Control | 235.7 ± 17.6 | 225.3 ± 3.6 |
| Hybrid A | 260.9 ± 39.2 | 333.5 ± 13.6 |
| Hybrid B | 299.8 ± 16.2 | 355.7 ± 8.1 |
| Hybrid C | 284.6 ± 52.8 | 382.7 ± 3.2 |
| Hybrid D | 316.1 ± 30.7 | 422.2 ± 7.4 |

TABLE 3

| Resin Impregnated Examples | Max Load (N) | Tex Value (g/km) |
| --- | --- | --- |
| Control | 282.6 ± 73.1 | 392.6 ± 24.0 |
| Hybrid A | 445.1 ± 43.8 | 505.9 ± 46.5 |
| Hybrid B | 521.6 ± 60.0 | 543.0 ± 52.0 |
| Hybrid C | 494.9 ± 56.2 | 582.6 ± 45.2 |
| Hybrid D | 541.9 ± 13.5 | 675.5 ± 14.7 |

Tensile data for the dry examples showed an increase of 11-34% in the normalized tensile strength compared to the control, depending on the weight percentage of nanotube yarns in the hybrid tows. The greatest improvement was demonstrated in Hybrid B examples having 36.7 wt % CNT (i.e. H5_1 to H5_5 from Table 1), which showed a tensile strength increase of 33% over the control (i.e. CF_1 to CF_5 from Table 1).

When more than 36.7 wt % CNT yarns, i.e. in example H6 and H7, the improvement in tensile strength became less significant; therefore, the Hybrid B examples were considered to be the most promising material and was used to make an example triaxial hybrid braid.

Figure 6:
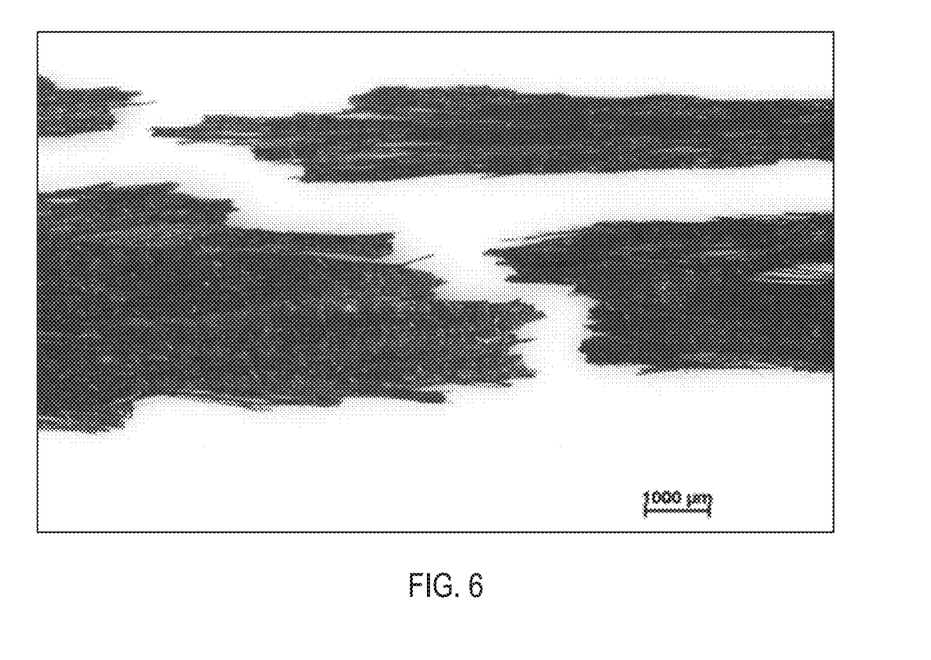
FIG. 6 is an optical micrograph of a ruptured control strand after tensile testing in accordance with the present subject matter.
Figure 7:
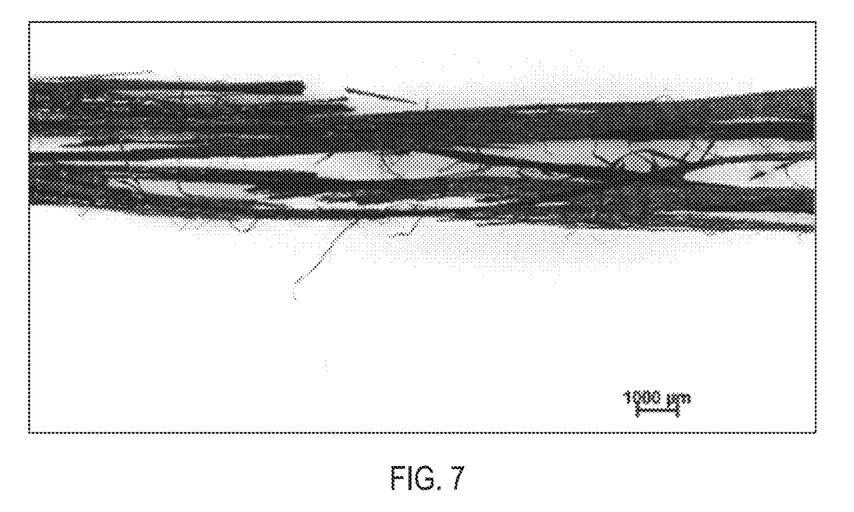
FIG. 7 is a micrograph of a ruptured hybrid tow after tensile testing in accordance with the present subject matter.

FIGS. 6 and 7 show the difference in fracture surfaces of the resin impregnated carbon-fiber-only control (FIG. 6) versus the impregnated hybrid tows (FIG. 7). The control strand in FIG. 6 shows a brittle failure with a clean break across the more brittle CF strand, whereas the hybrid tows in FIG. 7 shows brittle failure through the CF tow but ductile failure within the CNT yarns. This mixed mode failure of the hybrid tow demonstrates that the addition of CNT yarn may improve toughness of the hybrid tow by increasing the material's strain-to-failure.

For making example triaxial hybrid braids, a 2D circular braider was used to triaxially braid CF tows and hybrid tows. A 6K CF tow of Hexcel's IM7 carbon fiber was used as the axial braiding strands (0°), and the hybrid tows were used for the warp and weft braiding strands (i.e. ± bias directions). Hexcel IM7-6K material typically has a tensile strength of about 5.52 GPa and a tensile modulus of 276 GPa. On average, its density is approximately 1.78 g/cm³ and has a tex value of 0.223 g/m.

The 2D circular braider included 72 carriers in total that each holds a spool of braiding strands. The hybrid tows were placed in carriers for the warp and weft directions (i.e. ± bias directions) and accounted for 48 of the carriers in the front of the braider. The remaining 24 carriers in the back of the braider held the CF tows for the axial direction (0°). The carriers collect the free end of the braiding strands and are wrapped around two guide pulleys, which maintain tension on the braiding strands during the braiding process, and protect the braiding strands from excessive snaring or fraying. FIG. 2 identifies the fibers in the triaxial braid, showing the hybrid tows in the ± bias directions and the CF tows in the axial direction D. After the braiding strands are threaded through the carriers, the braiding strands were taped to the mandrel.

A 60° braid angle was the example triaxial hybrid braid because commercially available carbon-fiber-only braid material used for aeronautics applications had the same braid angle.

Equation 1 for producing a specific braid angle on 2D circular braiders is found below, where the braid angle (represented by α) was determined by modifying three other parameters: the rotational braid speed in rpm (Ω), the translational mandrel speed in in./min. (V); and the radius of the mandrel in inches (R).

$$\frac{\alpha}{2} = \tan^{-1}\left(\frac{R \cdot \Omega}{V}\right) \quad \text{(Equation 1)}$$

The braid angle varied with different ratios between the braid speed and the mandrel speed. Numerous speeds were tested in various combinations to achieve an approximate braid angle of 60°. Preliminary results showed that a braid speed of 6 rpm and a mandrel speed of 15.6 in/min produced a braid angle of 60° for the control braid. The preliminary results were found to be in agreement with Equation 1.

Another braid property is the coverage factor (C), which refers to the percentage of mandrel surface that is left uncovered by the braid. To calculate the coverage factor C, the ratio between the surface area of the strands, Sy, and the total area of the surface of the mandrel, Sm, should be measured as seen in Equation 2.

$$C = 1 - \frac{S_y}{S_m} \quad \text{(Equation 2)}$$

The coverage factor (C) may contribute to maintaining strength within the braid and reducing deformation. Moreover, there are some applications that may dictate a larger or smaller coverage. For example, applications involving a PMC 16 part with a complex geometry may require a triaxial braid with a low coverage factor to allow easier draping of the braid. However, with reduced coverage there is more space for the braiding strands to shift, which could affect the tensile properties of the hybrid braid after processing.

Optical microscopy was used to measure braid angle and coverage factor for all triaxial braids. Optical microscopy was also used to determine the size of the CF tows and hybrid tows, and also evaluate the fracture events following tensile testing.

Figure 1:
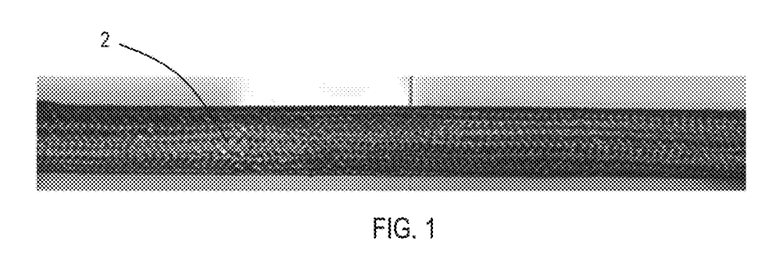
FIG. 1 is a drawing of a triaxial braid in accordance with the present subject matter.

The parameters for braiding were also varied to produce triaxial hybrid braids with various braid angles and coverage rates. The settings that were found to achieve the most coverage with closest to a 60° braid angle was a braid speed of 6 rpm and mandrel speed of 20 in/min for the mandrel used. The average coverage for these settings revealed that 1.8% of the surface of the mandrel was uncovered. An image of an example hybrid braid of CF tows triaxially braided with CNT yarn onto the PVC mandrel is shown in FIG. 1.

The triaxial hybrid braid was removed from the mandrel and cut using electrical rotary shears. The triaxial hybrid braid could only be cut using electrical rotary shears designated for heavy duty textiles, because specialty scissors or razors were not effective at cutting the hybrid triaxial braid. On the other hand, it is quite easy to cut carbon-fiber-only triaxial braids with standard scissors. The difficulty with cutting the triaxial hybrid braid demonstrates how robust these reinforcement materials are.

Visual inspection of the hybrid triaxial braid shown in FIG. 2 shows that in the hybrid tows 4 in the ± bias directions, the CNT yarns 12 were separated from the adjacent carbon fiber tow 10, which are held together by sizing agents. However, the CNT yarns 12 did not contain sizing agents and are of a different size, i.e. 270 μm in diameter. Therefore, in the hybrid tows 4, such separation between the CNT yarns 12 and the CF tow 10 may be expected due to these differences.

From the examples it can be seen that adding five CNT yarns, which accounted for 36.7 wt % of the hybrid tows, produced a 34% increase in specific strength of compared to carbon-fiber-only control strands. This shows a potential improvement in toughness when adding the CNT yarns to a CF tow. The benefits of increasing toughness through the CNT yarn reinforcement material include simplified processing by using less viscous resins and more efficient load transfer between the reinforcement and matrix materials.

Optical microscopy was used to measure braid angle and coverage rates, which aided in determining how these characteristics were affected by the braiding parameters for the triaxial hybrid braid.

Although CNT yarns by themselves may not be appropriate for replacement as an alternative to carbon fiber, they can be used as a reinforcement in conjunction with carbon fiber to produce the hybrid tows and were found to produce a reinforcement material with a good balance of stiffness and toughness. The CNT yarns were found to be the component responsible for adding toughness to the hybrid tows beyond that provided by the CF tows alone.

The mandrel on the braider was a PVC pipe with an outer diameter (OD) radius of 1.5 inches. The mandrel was secured to the braider by two circular vices on each end of the mandrel to secure the mandrel to the braider. The braider was operated in manual mode to ensure the braid and mandrel speeds could be varied while the braiding parameters, such as mandrel speed, braid speed, and braid angle were adjusted.

The braider has a conventional operation of braiding by moving the carriers on the braiding plane in a circular, sinusoidal motion through the horn gear system. The carriers in the warp direction rotate counterclockwise, and the weft rotate clockwise. This motion allows the strands to cross over one another and thus define the braid angle. The remaining 24 carriers in the back of the braider hold the spools of strands in the axial direction, which provide stiffness in the axial direction D to the mandrel, thus forming the triaxial hybrid braid.

Example PMCs were prepared as tows and laminates. To fabricate the composite, resin was brushed onto four different reinforcement architectures, in which the composites were comprised of three layers of reinforcement of carbon-fiber-only triaxial braids (CF) and/or a triaxial hybrid braids (H) as indicated in Table 4.

TABLE 4

| Composite | Ply Layup |
| --- | --- |
| A | CF-CF-CF |
| B | CF-H-CF |
| C | H-CF-H |
| D | H-H-H |

The targeted fiber-to-resin content was 50/50 for the composites, which was the same as the target for the strand tests. A Wabash hot press was used to cure the resins in the composites by laying up the three plies of triaxial braid layers according to Table 4, and hot pressing the structure at 90 psi at 350° F. (177° C.) for 2 hours. The resin mass was validated through TGA.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A triaxial hybrid braid comprising hybrid tows, wherein the hybrid tows include carbon nanotube yarns commingled with a carbon fiber tow, wherein an amount of the carbon nanotube yarns is 30-40 wt % of the hybrid tows.

2. The braid according to claim 1, wherein the hybrid tows are arranged in a + bias direction of the braid, a − bias direction of the braid, an axial direction of the braid, or combinations thereof.

3. The braid according to claim 2, wherein:
the hybrid tows are arranged in the + bias direction and in the − bias direction; and
the braid further comprises carbon fiber tows arranged in the axial direction.

4. The braid according to claim 1, wherein the carbon fiber tow has 5500-6500 carbon filaments.

5. The braid according to claim 1, wherein the hybrid tows are impregnated with resin.

6. A composite comprising a triaxial hybrid braid and a cured resin, wherein:
the braid includes hybrid tows; and
the hybrid tows include carbon nanotube yarns commingled with a carbon fiber tow, wherein an amount of the carbon nanotube yarns is 30-40 wt % of the hybrid tows.

7. The composite according to claim 6, wherein the hybrid tows are arranged in a + bias direction of the braid, a − bias direction of the braid, an axial direction of the braid, or combinations thereof.

8. The composite according to claim 7, wherein:
the hybrid tows are arranged in the + bias direction and in the − bias direction; and
the braid further comprises carbon fiber tows arranged in the axial direction.

9. The composite according to claim 6, wherein the composite includes at least one ply of the braid.

10. The composite according to claim 9, wherein the composite further includes at least one ply of triaxially braided carbon fiber tows.

11. The composite according to claim 6, wherein the braid has a braid angle of 50-70 degrees and a coverage of 95-99%.

12. A method of making a composite material, comprising:

commingling carbon nanotube yarns with a carbon fiber tow to produce hybrid tows, wherein an amount of the carbon nanotube yarns is 30-40 wt % of the hybrid tows; and triaxially braiding the hybrid tows to form a braid;

wherein the hybrid tows are arranged in a + bias direction of the braid, a − bias direction of the braid, an axial direction of the braid, or combinations thereof.

13. The method according to claim 12, wherein:

the hybrid tows are triaxially braided with carbon fibers tows, and the triaxially braiding includes arranging the hybrid tows in the + bias direction and the - bias direction, and arranging the carbon fiber tows in the axial direction.

14. The method according to claim 12, wherein the triaxially braiding is performed on a 2D circular braider at a braid speed of 3-9 rotations per minute and a mandrel speed of 10-30 inches per minute.

15. The method according to claim 12, further including impregnating the braid with a resin, and curing the resin.

16. The method according to claim 15, further including layering a ply of the braid with a ply of triaxially braided carbon fiber tows. resin.

17. The method according to claim 15, wherein the resin includes epoxy resin.

* * * * *